United States Patent
Diehl

(10) Patent No.: US 11,968,305 B2
(45) Date of Patent: Apr. 23, 2024

(54) FOUR-FACTOR AUTHENTICATION

(71) Applicants: Sony Corporation, Tokyo (JP); Sony Pictures Entertainment Inc., Culver City, CA (US)

(72) Inventor: Eric Diehl, Culver City, CA (US)

(73) Assignees: Sony Group Corporation, Tokyo (JP); Sony Pictures Entertainment, Inc., Culver City, CA (US)

(*) Notice: Subject to any disclaimer, the term of this patent is extended or adjusted under 35 U.S.C. 154(b) by 63 days.

(21) Appl. No.: 17/129,314

(22) Filed: Dec. 21, 2020

(65) Prior Publication Data

US 2021/0344493 A1 Nov. 4, 2021

Related U.S. Application Data

(60) Provisional application No. 63/017,507, filed on Apr. 29, 2020.

(51) Int. Cl.
*H04L 9/32* (2006.01)
*H04L 9/00* (2022.01)
*H04L 9/08* (2006.01)

(52) U.S. Cl.
CPC .......... *H04L 9/3228* (2013.01); *H04L 9/0825* (2013.01); *H04L 9/3247* (2013.01);
(Continued)

(58) Field of Classification Search
CPC ... H04L 9/3228; H04L 9/3239; H04L 9/0825; H04L 9/3247; H04L 9/3271; H04L 9/3297; H04L 2209/38; H04L 9/50; G09C 5/00
See application file for complete search history.

(56) References Cited

U.S. PATENT DOCUMENTS

| 2004/0243856 A1 | 12/2004 | Shatford |
| 2016/0274561 A1 | 9/2016 | Stone |

(Continued)

FOREIGN PATENT DOCUMENTS

| WO | WO-2007035469 A2 | 3/2007 |
| WO | 2019027139 A1 | 2/2019 |
| WO | WO-2019095200 A1 | 5/2019 |

OTHER PUBLICATIONS

Nasrulin Bulat, et al.: "A Robust Spatio-Temporal Verification Protocol for Blockchain", Oct. 20, 2018 (Oct. 20, 2018), SAT 2015, Springer, LNCS,p. 52-67, XP047491659, ISBN: 978-3-540-74549-5.

*Primary Examiner* — Shin-Hon (Eric) Chen
*Assistant Examiner* — Brian William Avery
(74) *Attorney, Agent, or Firm* — Procopio, Cory, Hargreaves & Savitch LLP

(57) ABSTRACT

Verifying that a user is using a device at a pre-specified location between a start time and an end time, including: calculating a challenge and an answer that is a function of the challenge; generating and storing in a blockchain, a commitment including an identity of the user, an identity of the device, the pre-specified location associated with the user, the start time of usage of the device, the end time of usage of the device, and the calculated challenge; generating a visual code of the device to carry the answer; encrypting the generated visual code with a public key of the device, wherein the encrypted visual code may only be decrypted with a private key of the device; and storing the encrypted visual code in the blockchain.

13 Claims, 10 Drawing Sheets

(52) U.S. Cl.
CPC .......... *H04L 9/3271* (2013.01); *H04L 9/3297* (2013.01); *H04L 9/50* (2022.05)

(56) References Cited

U.S. PATENT DOCUMENTS

| | | |
|---|---|---|
| 2019/0128525 A1 | 5/2019 | Han |
| 2019/0207995 A1 | 7/2019 | Gonzales, Jr. |
| 2019/0372769 A1 | 12/2019 | Fisher |
| 2020/0037158 A1 | 1/2020 | Soundararajan |
| 2020/0145198 A1* | 5/2020 | Guan ........................ H04L 9/30 |
| 2021/0042743 A1* | 2/2021 | Green ................ G06Q 20/1085 |
| 2021/0119764 A1* | 4/2021 | Meghji ............... H04L 63/0407 |
| 2021/0314139 A1* | 10/2021 | Zhang ................... H04L 9/0825 |

\* cited by examiner

FOUR-FACTOR AUTHENTICATION

CROSS-REFERENCE TO RELATED APPLICATIONS

This application claims the benefit of priority under 35 U.S.C. § 119(e) of co-pending U.S. Provisional Patent Application No. 62/017,507, filed Apr. 29, 2020, entitled "Four-Factor Authentication." The disclosure of the above-referenced application is incorporated herein by reference.

BACKGROUND

Field

The present disclosure relates to techniques for authentication, and more specifically, to system and method for storing and verifying data for indicating multiple factors.

Background

Proving that a person is using a specific device at a given location and at a given time is often crucial. This proof may, for instance, grant access to some restricted resources for a given time slot. For example, it may be important to ensure that a remote user operates the computer the user received from the company at a given period of time and that it is used in the privacy of the user's residence rather than in a public café.

SUMMARY

The present disclosure provides for: associating a user with user identifying data, cryptographic keys, and a mobile device; and associating a device with device identifying data, and cryptographic keys. The present disclosure also includes: a scheduler system that manages commitments and includes one or more databases to store user and device data; and a validator system that accesses data to review commitments, and user and device data.

In one implementation, a method for verifying that a user is using a device at a pre-specified location between a start time and an end time is disclosed. The method includes: calculating a challenge and an answer that is a function of the challenge; generating and storing in a blockchain, a commitment including an identity of the user, an identity of the device, the pre-specified location associated with the user, the start time of usage of the device, the end time of usage of the device, and the calculated challenge; generating a visual code of the device to carry the answer; encrypting the generated visual code with a public key of the device, wherein the encrypted visual code may only be decrypted with a private key of the device; and storing the encrypted visual code in the blockchain.

In one implementation, the method further includes transferring the encrypted visual code to the device. In one implementation, the method further includes decrypting the encrypted visual code using the private key of the device; and displaying an image of the visual code on a display. In one implementation, the method further includes capturing the image of the visual code using a mobile device; and extracting the visual code. In one implementation, the method further includes generating, by the mobile device, a message including the commitment with a location of the mobile device, the identity of the device obtained from the extracted visual code, and a current time; and signing the message with a private key of the user to generate a signature. In one implementation, the method further includes verifying the commitment when the message is received and the signature matches a public key of the user. In one implementation, the method further includes verifying the commitment when the message is received and a value of the extract visual code matches the calculated challenge. In one implementation, the method further includes verifying the commitment when the message is received and the pre-specified location is substantially equal to the location of the mobile device. In one implementation, the method further includes verifying the commitment when the message is received and the current time is within a time slot bounded by the start time and the end time.

In another implementation, a non-transitory computer-readable storage medium storing a computer program to verify that a user is using a device at a pre-specified location between a start time and an end time is disclosed. The computer-readable storage medium includes executable instructions that cause a computer to: calculate a challenge and an answer that is a function of the challenge; generate and store in a blockchain, a commitment including an identity of the user, an identity of the device, the pre-specified location associated with the user, the start time of usage of the device, the end time of usage of the device, and the calculated challenge; generate a visual code of the device to carry the answer; encrypt the generated visual code with a public key of the device, wherein the encrypted visual code may only be decrypted with a private key of the device; and store the encrypted visual code in the blockchain.

In another implementation, a system for verifying that a user is using a device at a pre-specified location between a start time and an end time is disclosed. The system includes: a blockchain; a device to be authenticated, wherein the device accesses the blockchain through a network connection, wherein the blockchain stores a commitment including an identity of the device to authenticate, an identity of a user of the device, a pre-specified location associated with the user, the start time of usage of the device, the end time of usage of the device, and a challenge; a public key and a private key of the device for encryption and decryption that are stored in the device and in the blockchain; a public key and a private key of the user for encryption and decryption that are stored in the blockchain; and a scheduler to generate a visual code of the device to carry an answer to the challenge, to encrypt the generated visual code with the public key of the device, wherein the encrypted visual code may only be decrypted with a private key of the device, and to store the encrypted visual code in the blockchain.

In one implementation, the system further includes a mobile device to capture an image of a decrypted visual code and generate a message including the commitment with a location of the mobile device, the identity of the device obtained from the extracted visual code, and a current time.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings in which.

DETAILED DESCRIPTION

As described above, proving that a person is using a specific device at a given location and at a given time is often crucial.

Certain implementations of the present disclosure provide systems and methods to implement a technique for authentication. In one implementation, a system stores and verifies data for information indicating four factors: a user, a device, a location, and a time period. In another implementation, different factors or a different number of factors can be used.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1:
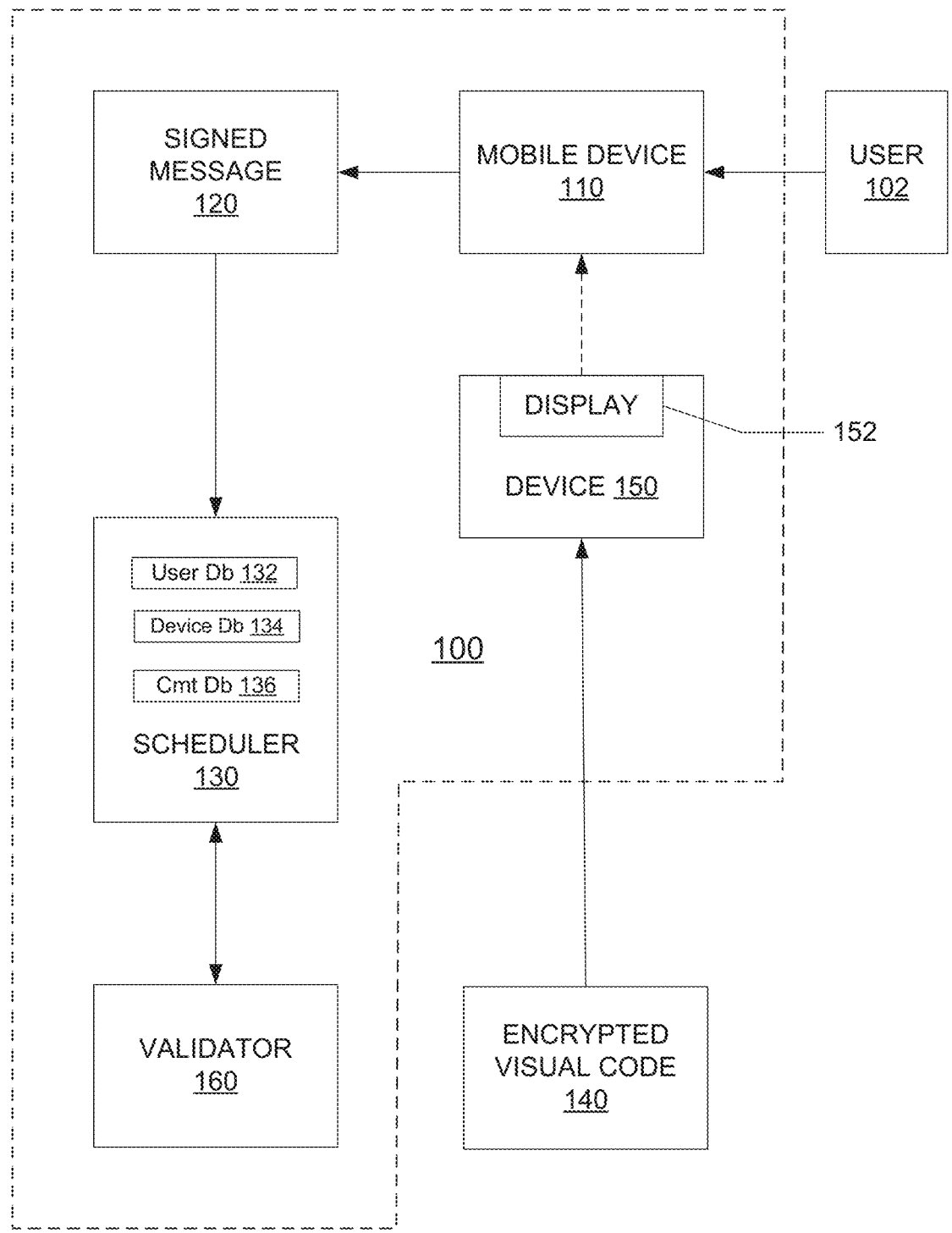
FIG. 1 is a block diagram of a system to implement a multi-factor authentication in accordance with one implementation of the present disclosure.

FIG. 1 is a block diagram of a system 100 to implement a multi-factor authentication in accordance with one implementation of the present disclosure. In the illustrated implementation of FIG. 1, the system 100 includes a mobile device 110, a scheduler 130, a device 150, and a validator 160.

Each user (e.g., a user 102) participating in the system 100 may have a user identity, a user public key, and a user private key. In one implementation, the mobile device 110 is configured to capture images, detect its own position, and communicate with remote servers. The mobile device may also hold the user private key.

Each device (e.g., device 150) participating in the system 100 may have a device identity, a device public key, and a device private key. The device 150 also includes the means to display images and communicate with remote servers.

In one implementation, the scheduler 130 generates at least one commitment for a user. A commitment may include at least following parameters: the user identity; the device identity of a device to authenticate; the location to authenticate, e.g., the user's residence; a start time of the usage of the device; an end time of the usage of the device; the generated challenge; and a status flag. The scheduler 130 may include at least: a user database 132 to store the user identity and the user public key linked to the user identity; a device database 134 to store the device identity and the device public key linked to the device identity; and a commitment database 136 to store the at least one generated commitment.

In one implementation, the validator 160 queries the scheduler 130 whether the user 102 successfully committed to a device at a given location and at a given time slot. Thus, when the scheduler 130 is requested by the validator 160 to verify that the user 102 is using the device 150 at a pre-specified location from the start time to the end time, the scheduler 130 may proceed as described below.

Figure 2:
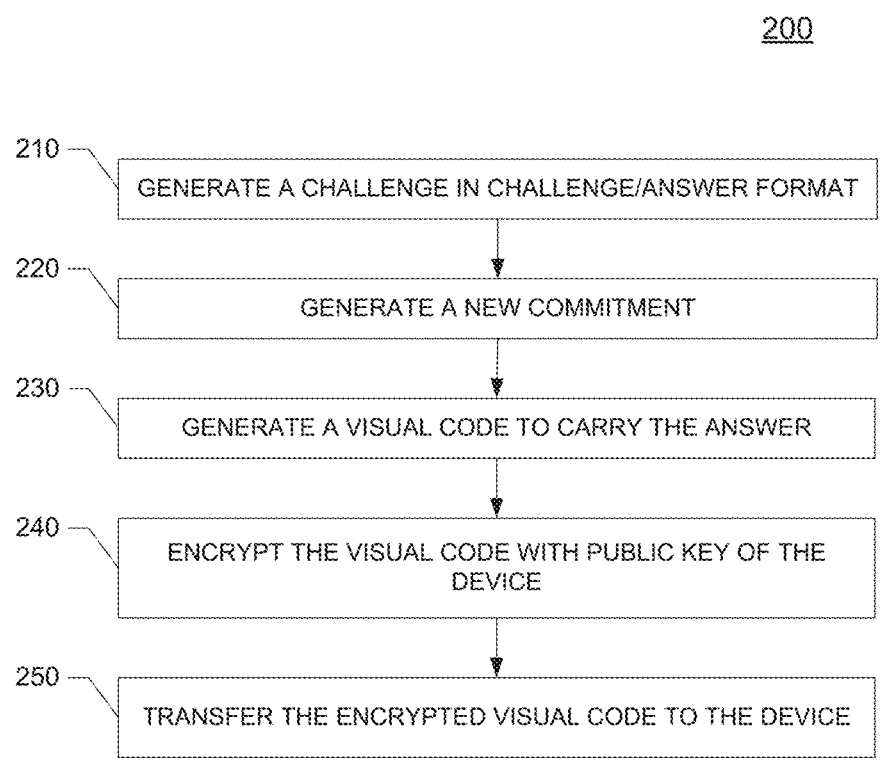
FIG. 2 is a flow diagram of a process for verifying that a user is using a device at a pre-specified location from the start time to the end time in accordance with one implementation of the present disclosure.

FIG. 2 is a flow diagram of a process 200 for verifying that a user is using a device at a pre-specified location from the start time to the end time in accordance with one implementation of the present disclosure. In the illustrated implementation of FIG. 2, a nonce, called a challenge, may be generated, at step 210, in a challenge and answer format, where answer=g(challenge) and g is a non-reversible function, i.e., knowing answer it is computationally hard to guess the challenge.

A new commitment may be generated, at step 220, to store at least the following information: (1) an identity of the user; (2) an identity of a device to authenticate; (3) a location to authenticate, e.g., the user's residence; (4) a start time; (5) an end time; (6) a generated challenge; and (7) a status flag that is initially set to "false". A visual code that carries the answer is then generated at step 230, and the visual code is encrypted with the public key of the device 150, at step 240. The resultant encrypted visual code 140 may then be transferred to the device 150, at step 250. It should be noted that the encrypted visual code may only be decrypted with the private key of the device. In one implementation, steps 210 through 250 are performed by the scheduler 130.

Figure 3:
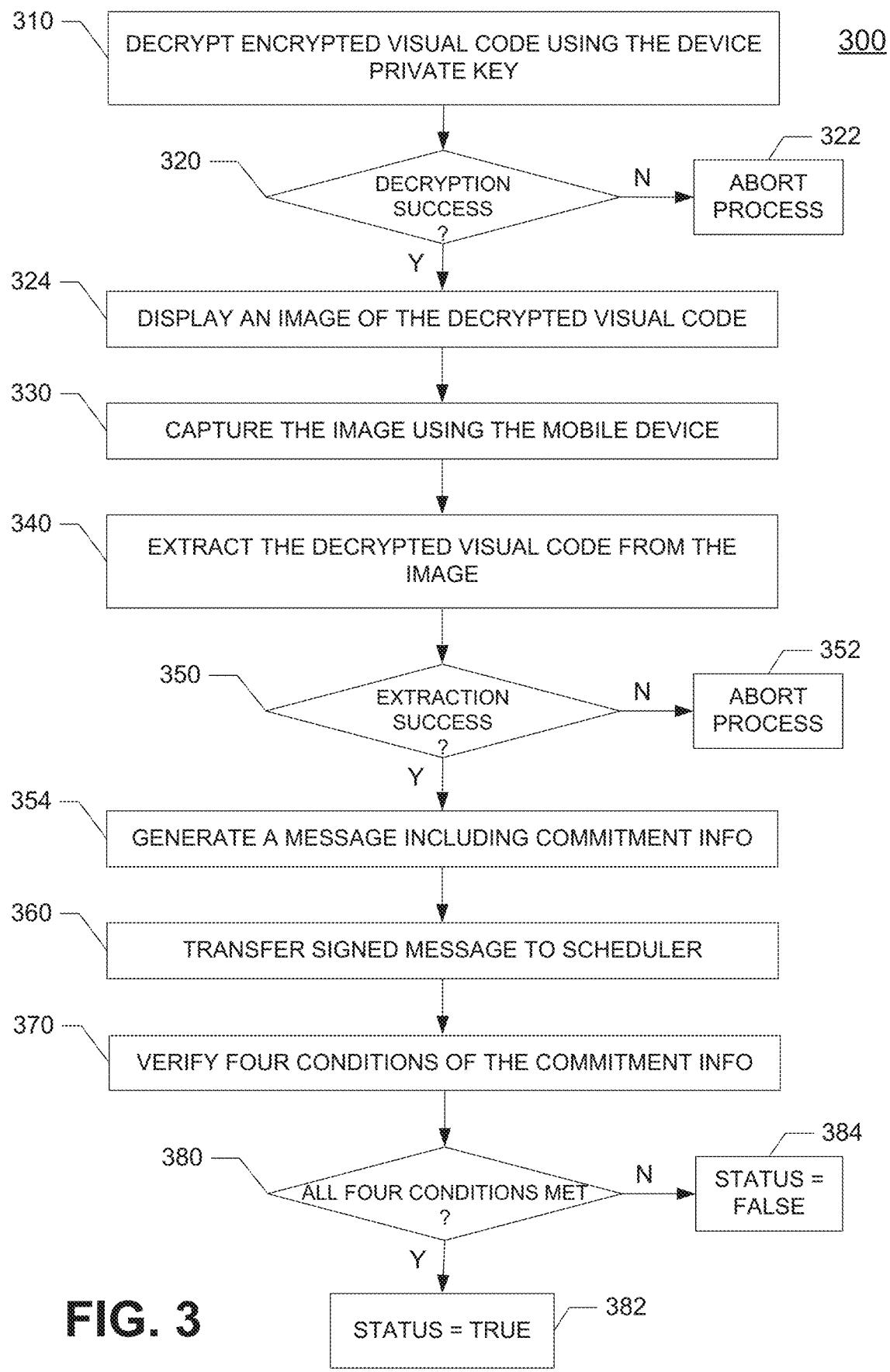
FIG. 3 is a flow diagram of a process for verifying that the user is compliant with the generated commitment in accordance with one implementation of the present disclosure.

FIG. 3 is a flow diagram of a process 300 for verifying that the user is compliant with the generated commitment in accordance with one implementation of the present disclosure. In the illustrated implementation of FIG. 3, the encrypted visual code 140 is decrypted by the device 150 using the device private key, at step 310. If the decryption is determined to be successful, at step 320, the device 150 displays an image of the decrypted visual code on a display 152, at step 324. Otherwise, if the decryption is not successful, the process 300 is aborted, at step 322.

In the illustrated implementation of FIG. 3, the user 102 captures the image (of the decrypted visual code) displayed on the display 152 of the device 150 using the mobile device 110, at step 330. The mobile device 110 may then extract the decrypted visual code (i.e., the visual code) from the captured image, at step 340. If the extraction is determined to be successful, at step 350, the mobile device 110 may generate a message 120 which includes commitment information, at step 354, by signing the message 120 with the user private key. Otherwise, if the extraction is not successful, the process 300 is aborted, at step 352. In one implementation, the commitment information includes at least the following: (1) an identity of the user; (2) the value carried by the visual code; and (3) the location of the mobile device. The mobile device 110 may transfer the signed message 120 to the scheduler 130, at step 360.

The scheduler 130 may then verify the commitment information with the signed message, at step 370. In one implementation, the scheduler 130 verifies the following four conditions, at step 370: (1) the signature of the signed message matches the user public key stored in the user database 132; (2) the value of the visual code matches the generated challenge (i.e., f(challenge)==code); (3) that the location-to-authenticate substantially matches the location of the mobile device; and (4) the current time is between the start time and the end time. If it is determined, at step 380, that all four conditions are met, then the scheduler 130 may set the status flag to "true", at step 382. Otherwise, if it is determined, at step 380, that not all four conditions are met, then the scheduler 130 may keep the status flag at "false", at step 384.

Figure 4:
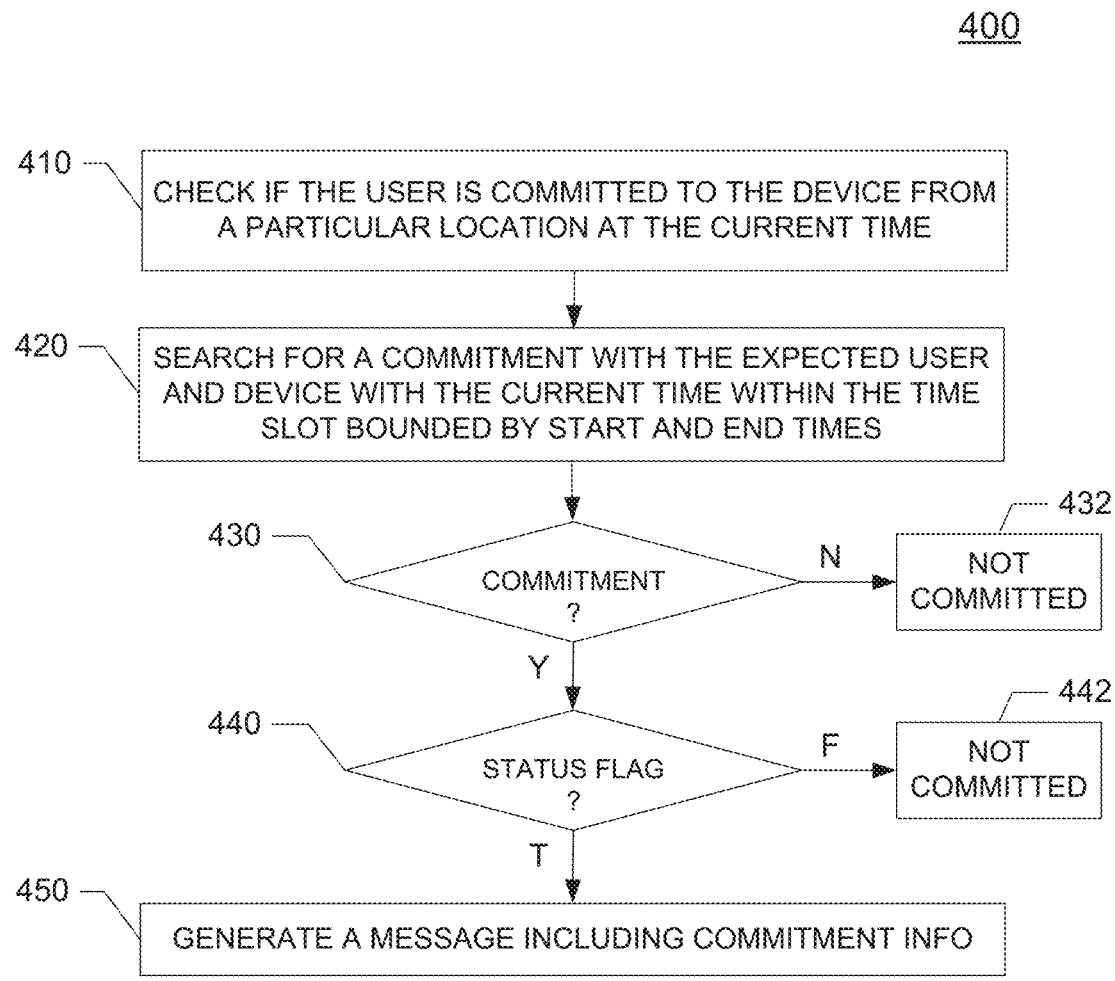
FIG. 4 is a flow diagram of a process for validating that the user is compliant with the generated commitment in accordance with one implementation of the present disclosure.

FIG. 4 is a flow diagram of a process 400 for validating that the user is compliant with the generated commitment in accordance with one implementation of the present disclosure. In the illustrated implementation of FIG. 4, a determination is made, at step 410, to check whether the user 102 is committed to the device 150 from a particular location at the current time. In one implementation, the determination is made by the validator 160 querying the scheduler 130 with at least the user identity and the device identity. The scheduler 130 may then search the commitment database 136, at step 420, for a commitment with the expected user, device, and with the current time within the time slot bounded by the start time and the end time. If it determined, at step 430, that there was no such commitment, then the scheduler 130 may answer the validator 160, at step 432, with a "not committed" message, and the process terminates. Otherwise, the scheduler 130 may check the corresponding status flag to determine if the status flag is "true", at step 440. If the scheduler 130 determines, at step 440, that the status flag is "true", the scheduler 130 answers the validator 160 with a "committed" message, along with the end time, at step 450. Otherwise, the scheduler 130 answers the validator 160 with a "not committed" message, at step 442.

Figure 5:
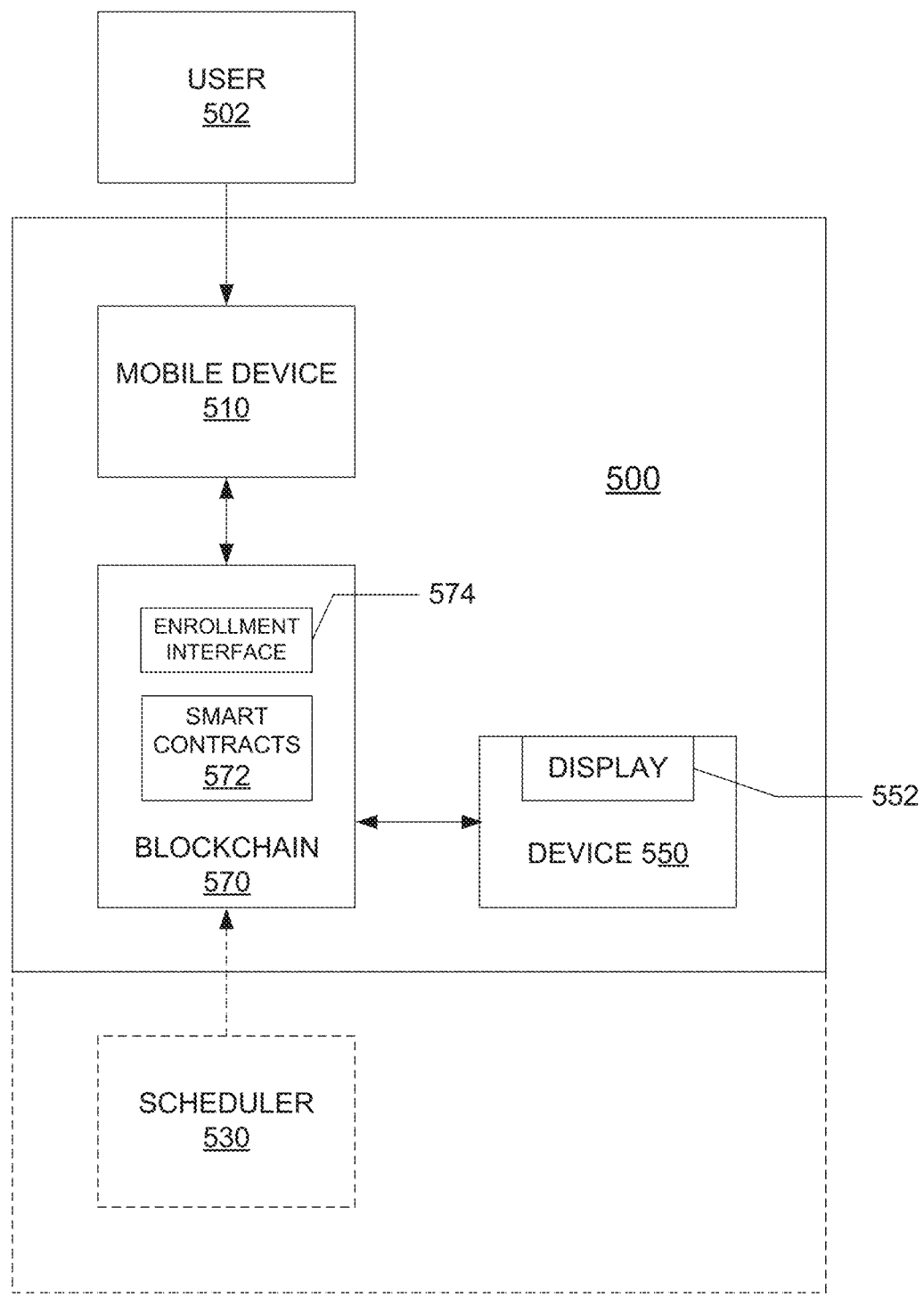
FIG. 5 is a block diagram of a system to implement a multi-factor authentication in accordance with another implementation of the present disclosure.

FIG. 5 is a block diagram of a system 500 to implement a multi-factor authentication in accordance with another implementation of the present disclosure. In FIG. 5, optional modules and signals are denoted with dotted lines. In the illustrated implementation of FIG. 5, the system 500 includes a mobile device 510, a scheduler 530, a device 550, and a blockchain 570. In one implementation, the blockchain 570 is a permissioned blockchain such as Hyperledger Fabric. The blockchain 570 may manage the functionalities of the validator 160, the user database 132, the device database 134, and the commitment database 136 shown in FIG. 1.

In the illustrated implementation of FIG. 5, the blockchain 570 executes dedicated applications including at least one smart contract 572, wherein entities enrolled in the permissioned blockchain may invoke the at least one smart contract 572. Thus, in FIG. 5, the blockchain may refer to the infrastructure and algorithms of the blockchain, such as distributed ledger, consensus algorithm, and verification of the signature of the invoked smart contracts.

Each user (e.g., a user 502) participating in the system 500 may be an enrolled member of the blockchain 570. Thus, the Certification Authority of the blockchain (which provides a number of certificate services to the members of a blockchain) may provide the user public key and the user private key. In one implementation, Hyperledger Fabric uses a 256-bit Elliptic Curve Cryptosystem.

Each device (e.g., device 550) participating in the system 500 may also be an enrolled member of the blockchain 570. Thus, the Certification Authority of the blockchain may also provide the device public key and the device private key.

In one implementation, the scheduler 530 is also an enrolled entity of the blockchain 570 with the role of a scheduler. To create a new commitment, the scheduler 530 may call a smart contract "create commitment" process (hereinafter referred to as a first smart contract process) with information including: (1) an identity of the user (i.e., the user identity); (2) an identity of a device to authenticate (i.e., the device identity); (3) a location to authenticate, which can be defined by a GPS position; (4) a start time; and (5) an end time.

Figure 6:
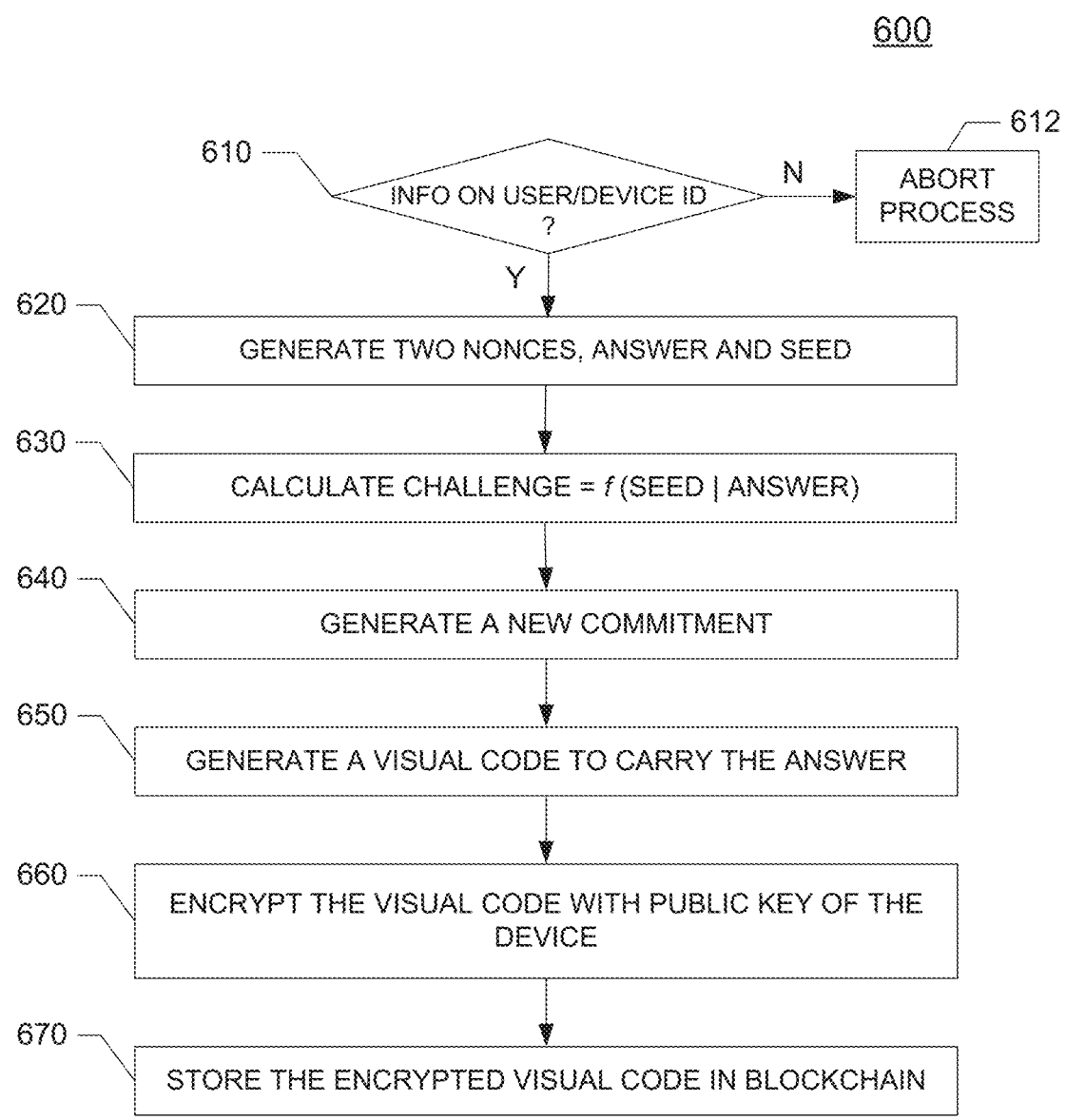
FIG. 6 is a flow diagram of a process to verify that a user is using a device at a pre-specified location from the start time to the end time in accordance with one implementation of the present disclosure.

FIG. 6 is a flow diagram of a process 600 for a smart contract "create commitment" to verify that a user is using a device at a pre-specified location from the start time to the end time in accordance with one implementation of the present disclosure. In the illustrated implementation of FIG. 6, a determination is made, at step 610, whether the blockchain has any information about the user identity and the device identity. If it is determined, at step 610, that the blockchain has the information about the user identity and the device identity, two nonces are generated, at step 620. Otherwise, the process 600 is aborted, at step 612. In one implementation, the generated nonces are answer and seed. A challenge may be calculated, at step 630, as challenge=f (seed|answer), wherein f is a secret function. In one implementation, the secret function is SHA256 function.

A new commitment may be generated, at step 640, to store at least the following information: (1) an identity of the user; (2) an identity of a device owned by the user; (3) the pre-specified location (e.g., the location of the user's residence); (4) a start time; (5) an end time; (6) a generated challenge; (7) a seed; and (8) a status flag that is initially set to "false". A visual code that carries the answer may be generated, at step 650, and the visual code may then be encrypted with the public key of the device 150, at step 660, by the process 600. The encrypted visual code may only be decrypted with the private key of the device 150. That is, only the device 150 with its private key can display the visual code containing the answer. In one implementation, the visual code is a Quick Response (QR) code. In other implementations, the visual code is a text code or bar code. The resultant encrypted visual code may then be stored in the blockchain, at step 670, by the first smart contract process 600.

Figure 7:
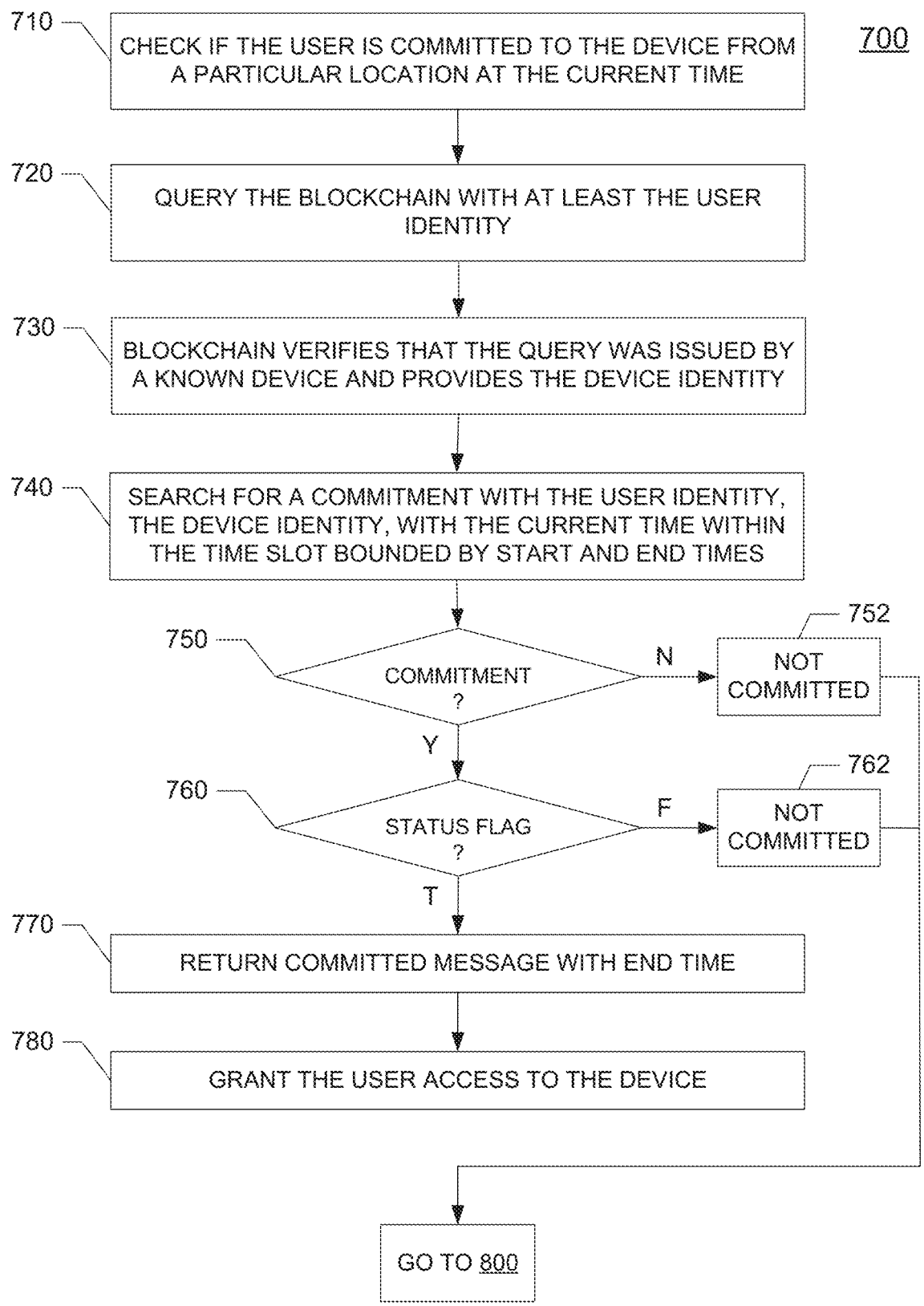
FIG. 7 is a flow diagram of a process to validate that the user is compliant with the generated commitment using a smart contract in accordance with one implementation of the present disclosure.

FIG. 7 is a flow diagram of a process 700 for a smart contract "is committed" to validate that the user is compliant with the generated commitment using a smart contract in accordance with one implementation of the present disclosure. In one implementation, the process 700 is performed after the process 600 has finished.

In the illustrated implementation of FIG. 7, the process 700 checks, at step 710, whether the user 502 is committed to the device 550 from a particular location at the current time. In one implementation, when the user 502 attempts to use the device 550, the device 550 queries the blockchain 570 with at least the user identity, at step 720. The blockchain 570 may then verify that the query was issued by a known device and provide the device identity to the smart contract, at step 730.

The smart contract may then search the blockchain 570, at step 740, for a commitment with the user identity, the device identity, and with the current time within the time slot bounded by the start time and the end time. If it determined, at step 750, that there was no such commitment, then the process 700 may return a "not committed" message to the device 550, at step 752. Otherwise, the process 700 may check the corresponding status flag to determine if the status flag is "true", at step 760. If the process 700 determines, at step 760, that the status flag is "true", the process 700 may return a "committed" message to the device 550, along with the end time, at step 770, and grant access to the device 550 to the user 502 until the end time, at step 780.

Otherwise, the process 700 returns a "not committed" message to the device 550, at step 762. If the device 550 receives the "not committed" message, at step 752 or 762, the device 550 does not grant access to the user 502. If the device 550 receives the "not committed" message, at step 752 or 762, the process 700 passes through to a process 800 illustrated in FIG. 8.

Figure 8:
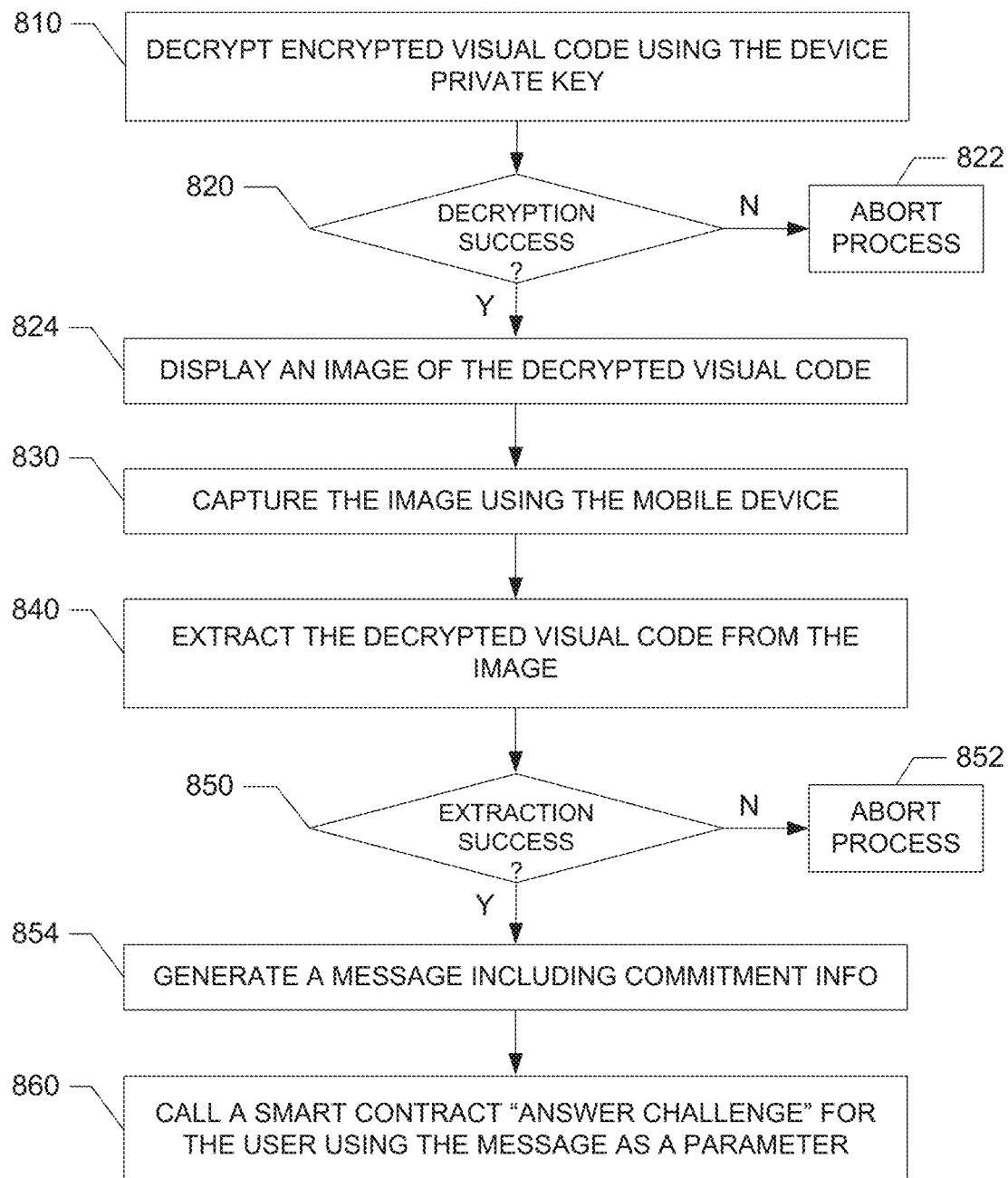
FIG. 8 is a flow diagram of a process for verifying that the user is compliant with the generated commitment in accordance with another implementation of the present disclosure.

FIG. 8 is a flow diagram of a process 800 for verifying that the user is compliant with the generated commitment in accordance with another implementation of the present disclosure. In the illustrated implementation of FIG. 8, the device 550 decrypts the encrypted visual code (stored in the blockchain 570 at step 670) using the device private key, at step 810. If the decryption is determined to be successful, at step 820, the device 550 displays an image of the decrypted visual code on a display 552, at step 824. Otherwise, if the decryption is not successful, the process 800 is aborted, at step 822.

In the illustrated implementation of FIG. 8, the user 502 captures the image (of the decrypted visual code) displayed on the display 552 of the device 550 using the mobile device 510, at step 830. The mobile device 110 may then extract the code from the decrypted visual code (i.e., the visual code) from the captured image, at step 840. If the extraction is determined to be successful, at step 850, the mobile device 510 may generate a message 120 which includes commitment information, at step 854. Otherwise, if the extraction is not successful, the process 800 is aborted, at step 852. In one implementation, the commitment information (generated in step 854) includes at least the following: (1) the extracted code; and (2) the location of the mobile device.

The mobile device 510 may then invoke a process 900 for a smart contract "answer challenge" on behalf of the user 502 using the message as a parameter, at step 860. In Hyperledger Fabric, the invoker may sign the request of a smart contract signed with its private key. Therefore, the invocation of the process 900 corresponds to a signed message.

Figure 9:
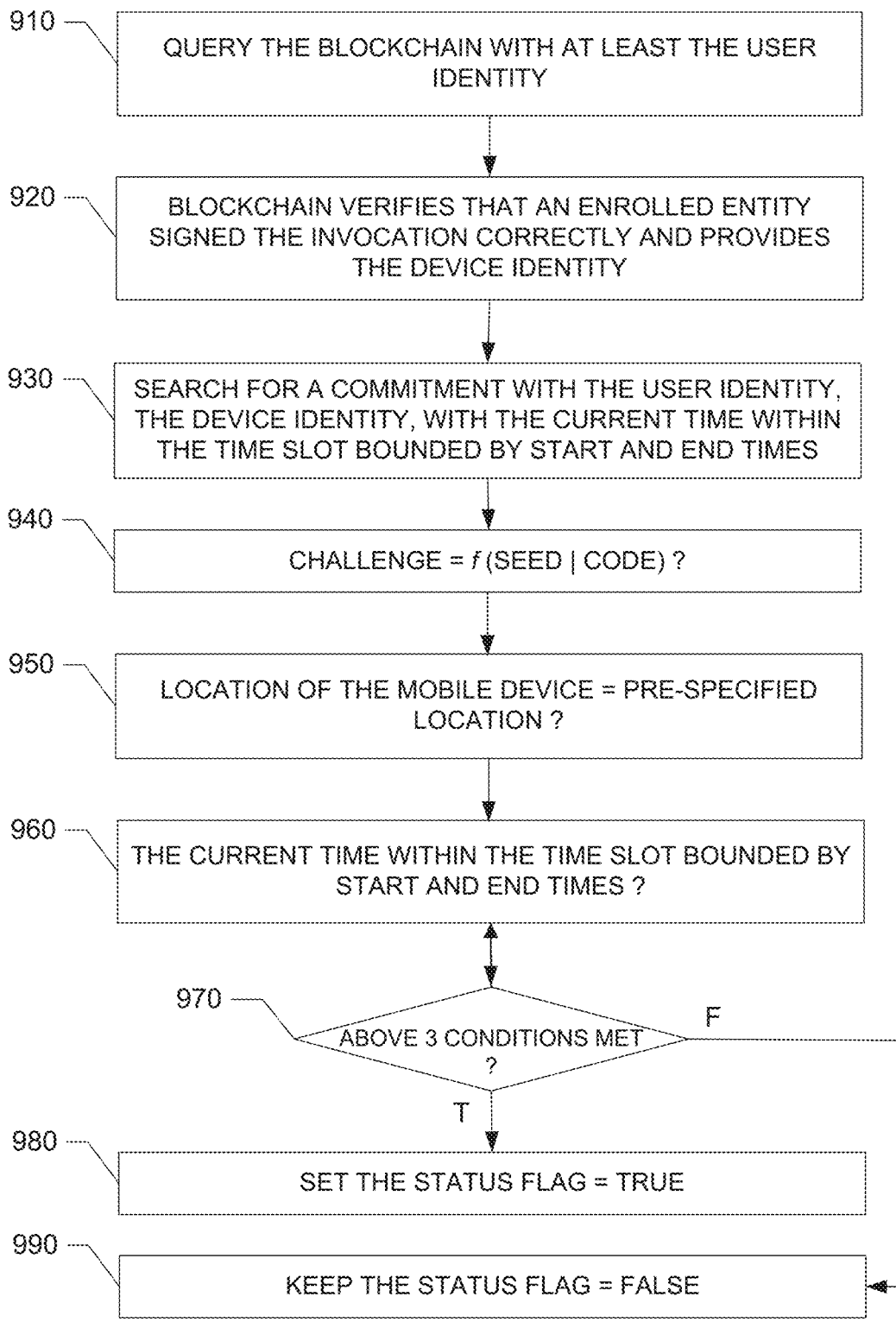
FIG. 9 is a flow diagram of a process to validate that the user is compliant with the generated commitment using a smart contract in accordance with another implementation of the present disclosure.

FIG. 9 is a flow diagram of a process 900 for a smart contract "answer challenge" to validate that the user is compliant with the generated commitment using a smart contract in accordance with another implementation of the present disclosure. In FIG. 9, the process 900 queries the blockchain 570 with at least the user identity, at step 910. When the process 900 receives an invocation of a smart contract, the blockchain (i.e., Hyperledger Fabric) may check whether an enrolled entity signed the invocation correctly, and may provide the identity of the invoker to ensure that the invoker is legitimate, at step 920. The smart contract may then search the blockchain 570, at step 930, for a commitment with the expected user identity, the device identity, and with the current time within the time slot bounded by the start time and the end time.

In the illustrated implementation of FIG. 9, the process 900 verifies three conditions. For the first condition, a challenge may be calculated, at step 940, as challenge=$f$ (seed|extracted code), wherein the extracted code was generated (at step 854) as commitment information included in the message 120, while the seed was generated (at step 640) as a new commitment. In one implementation, the function f is SHA256 function. For the second condition, the location of the mobile device (generated in step 854) is compared to the pre-specified location (generated in step 640), at step 950. For the third condition, a check is made, at step 960, whether the current time is within the time slot bounded by the start time and the end time. If all three conditions (of steps 940, 950, 960) are met, at step 970, then the status flag is set to true, at step 980. Otherwise, the status flag is kept at false, at step 990.

Figure 10A:
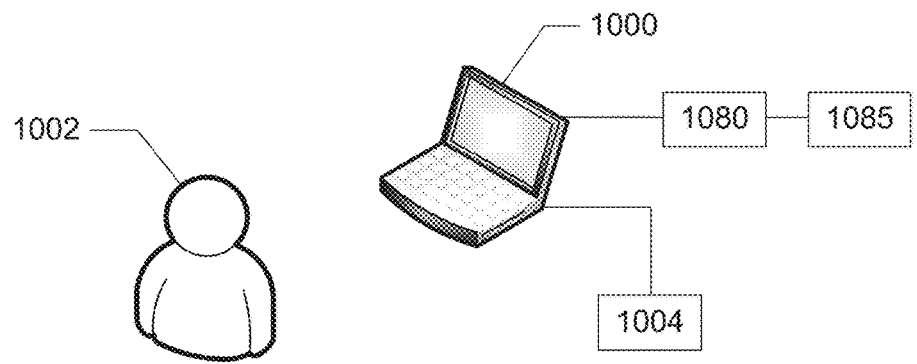
FIG. 10A is a representation of a computer system and a user in accordance with an implementation of the present disclosure.

FIG. 10A is a representation of a computer system 1000 and a user 1002 in accordance with an implementation of the present disclosure. The user 1002 uses the computer system 1000 to implement an authentication application 1090 as illustrated and described with respect to the processes 200, 300, 400, 600, 700, 800, 900 in FIGS. 2 to 4 and 6 to 9, respectively.

Figure 10B:
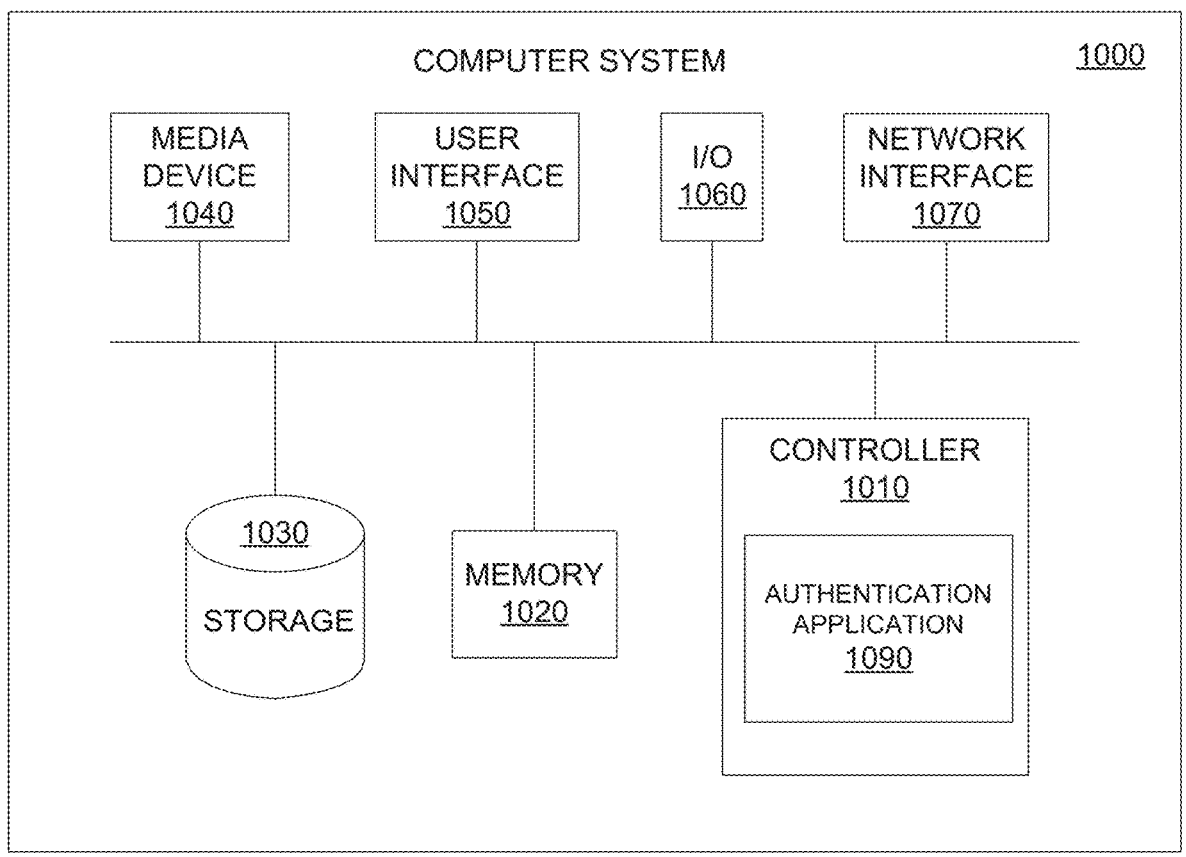
FIG. 10B is a functional block diagram illustrating the computer system hosting an authentication application in accordance with an implementation of the present disclosure.

The computer system 1000 stores and executes the authentication application 1090 of FIG. 10B. In addition, the computer system 1000 may be in communication with a software program 1004. Software program 1004 may include the software code for the authentication application 1090. Software program 1004 may be loaded on an external medium such as a CD, DVD, or a storage drive, as will be explained further below.

Furthermore, computer system 1000 may be connected to a network 1080. The network 1080 can be connected in various different architectures, for example, client-server architecture, a Peer-to-Peer network architecture, or other type of architectures. For example, network 1080 can be in communication with a server 1085 (e.g., a group of servers located at data sources) that coordinates engines and data used within the authentication application 1090. Also, the network can be different types of networks. For example, the network 1080 can be the Internet, a Local Area Network or any variations of Local Area Network, a Wide Area Network, a Metropolitan Area Network, an Intranet or Extranet, or a wireless network.

FIG. 10B is a functional block diagram illustrating the computer system 1000 hosting the authentication application 1090 in accordance with an implementation of the present disclosure. A controller 1010 is a programmable processor and controls the operation of the computer system 1000 and its components. The controller 1010 loads instructions (e.g., in the form of a computer program) from the memory 1020 or an embedded controller memory (not shown) and executes these instructions to control the system. In its execution, the controller 1010 provides the authentication application 1090 with a software system, such as to enable the creation and configuration of engines and interfaces within the authentication application 1090. Alternatively, this application can be implemented as separate hardware components in the controller 1010 or the computer system 1000.

Memory 1020 stores data temporarily for use by the other components of the computer system 1000. In one implementation, memory 1020 is implemented as RAM. In one implementation, memory 1020 also includes long-term or permanent memory, such as flash memory and/or ROM.

Storage 1030 stores data either temporarily or for long periods of time for use by the other components of the computer system 1000. For example, storage 1030 stores data used by the authentication application 1090. In one implementation, storage 1030 is a hard disk drive.

The media device 1040 receives removable media and reads and/or writes data to the inserted media. In one implementation, for example, the media device 1040 is an optical disc drive.

The user interface 1050 includes components for accepting user input from the user 1002 of the computer system 1000 and presenting information to the user 1002. In one implementation, the user interface 1050 includes a keyboard, a mouse, audio speakers, and a display. The controller 1010 uses input from the user 1002 to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (including, but not limited to 802.11) supporting an Ethernet connection.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, authentication can be used in various applications, such as granting, monitoring, limiting, or renting device access or content access. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method comprising:
    calculating a challenge and an answer that is a function of the challenge,
    wherein the challenge is a nonce and the function is non-reversible;
    generating and storing in a blockchain, a commitment including an identity of a user, an identity of the device, a pre-specified location associated with the user, a start time of usage of the device, an end time of usage of the device, and the calculated challenge,
    wherein the commitment is generated to verify that the user is committed to using the device as specified;
    generating a visual code of the device to carry the answer;
    encrypting the generated visual code with a public key of the device, wherein the encrypted visual code may only be decrypted with a private key of the device;
    storing the encrypted visual code in the blockchain;
    transferring the encrypted visual code to the device;
    decrypting, by the device, the encrypted visual code using the private key of the device;
    displaying an image of the visual code on a display of the device;
    capturing the image of the visual code using a camera device;
    extracting, by the camera device, the visual code that carries the answer corresponding to the challenge;
    generating, by the camera device, a message including the commitment with a location of the camera device, the identity of the device obtained from the extracted visual code, and a current time;
    transmitting, by the camera device, the message; and
    verifying, using the message including the commitment, that the user is using the device at the pre-specified location between the start time and the end time.

2. The method of claim 1, further comprising:
    signing the message with a private key of the user to generate a signature.

3. The method of claim 2, further comprising
verifying the commitment when the message is received and the signature matches a public key of the user.

4. The method of claim 1, further comprising
verifying the commitment when the message is received and a value of the extract visual code matches the calculated challenge.

5. The method of claim 1, further comprising
verifying the commitment when the message is received and the prespecified location is equal to the location of the camera device.

6. The method of claim 1, further comprising
verifying the commitment when the message is received and the current time is within a time slot bounded by the start time and the end time.

7. A non-transitory computer-readable storage medium storing a computer program, the computer program comprising executable instructions that cause a computer to:
calculate a challenge and an answer that is a function of the challenge,
wherein the challenge is a nonce and the function is non-reversible;
generate and store in a blockchain, a commitment including an identity of a user, an identity of a device, a pre-specified location associated with the user, a start time of usage of the device, an end time of usage of the device, and the calculated challenge,
wherein the commitment is generated to verify that the user is committed to using the device as specified;
generate a visual code of the device to carry the answer;
encrypt the generated visual code with a public key of the device, wherein the encrypted visual code may only be decrypted with a private key of the device;
store the encrypted visual code in the blockchain;
transfer the encrypted visual code to the device; decrypt the encrypted visual code using the private key of the device;
display an image of the visual code on a display;
capture the image of the visual code using a camera device;
extract the visual code that carries the answer corresponding to the challenge;
generate a message including the commitment with a location of the camera device, the identity of the device obtained from the extracted visual code, and a current time;
transmit, by the camera device, the message; and
verify, using the message including the commitment, that the user is using the device at the pre-specified location between the start time and the end time.

8. The non-transitory computer-readable storage medium of claim 7, further comprising executable instructions that cause a computer to:
sign the message with a private key of the user to generate a signature.

9. The non-transitory computer-readable storage medium of claim 8, further comprising executable instructions that cause a computer to
verify the commitment when the message is received and the signature matches a public key of the user.

10. The non-transitory computer-readable storage medium of claim 7, further comprising executable instructions that cause a computer to
verify the commitment when the message is received and a value of the extract visual code matches the calculated challenge.

11. The non-transitory computer-readable storage medium of claim 7, further comprising executable instructions that cause a computer to
verify the commitment when the messsage is received and the pre-specified location is equal to the location of the camera device.

12. The non-transitory computer-readable storage medium of claim 7, further comprising executable instructions that cause a computer to
verify the commitment when the message is received and the current time is within a time slot bounded by the start time and the end time.

13. A system comprising:
a blockchain;
a device to be authenticated,
wherein it is to be verified that a user is using the device at a pre-specified location between a start time and an end time,
wherein the device accesses the blockchain through a network connection,
wherein the blockchain stores a commitment including an identity of the device to authenticate, an identity of a user of the device, a pre-specified location associated with the user, the start time of usage of the device, the end time of usage of the device, and a challenge,
wherein the commitment is generated to verify that the user is committed to using the device as specified;
a public key and a private key of the device for encryption and decryption that are stored in the device and in the blockchain;
a public key and a private key of the user for encryption and decryption that are stored in the blockchain;
a scheduler to generate a visual code of the device to carry an answer to the challenge, to encrypt the generated visual code with the public key of the device, wherein the encrypted visual code may only be decrypted with the private key of the device, and to store the encrypted visual code in the blockchain, wherein the challenge is a nonce and the function is non-reversible; and
a camera device:
to capture an image of a decrypted visual code,
generate a message including the commitment with a location of the camera device, the identity of the device obtained from the extracted visual code, and a current time, and
to transmit the message,
wherein the extracted visual code carries the answer corresponding to the challenge,
wherein the transmitted message is used to verify that the user is using the device at the pre-specified location between the start time and the end time.

* * * * *